(12) United States Patent
Severance et al.

(10) Patent No.: US 8,105,412 B2
(45) Date of Patent: Jan. 31, 2012

(54) FILTER ASSEMBLY WITH SEALED WINDOWED FLOW PATH

(75) Inventors: Stephanie F. Severance, Stoughton, WI (US); Chirag D. Parikh, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 791 days.

(21) Appl. No.: 12/243,069

(22) Filed: Oct. 1, 2008

(65) Prior Publication Data

US 2010/0077710 A1  Apr. 1, 2010

(51) Int. Cl.
 *B01D 46/00* (2006.01)
(52) U.S. Cl. .......................................... 55/495; 55/482
(58) Field of Classification Search .................. 55/482, 55/495
See application file for complete search history.

(56) References Cited

U.S. PATENT DOCUMENTS

| | | | |
|---|---|---|---|
| 4,145,280 A | 3/1979 | Middelbeek et al. | |
| 4,650,572 A | 3/1987 | Hayes | |
| 5,362,387 A | 11/1994 | Saito et al. | |
| 6,247,463 B1 | 6/2001 | Fedorowicz et al. | |
| 6,354,283 B1 | 3/2002 | Hawkins et al. | |
| 6,379,433 B1* | 4/2002 | Scranton, Jr. | 95/135 |
| 6,478,018 B2 | 11/2002 | Fedorowicz et al. | |
| 6,478,019 B2 | 11/2002 | Fedorowicz et al. | |
| 2002/0117158 A1 | 8/2002 | Burgess | |
| 2006/0124072 A1* | 6/2006 | Conger et al. | 119/417 |
| 2007/0240392 A1 | 10/2007 | Ng et al. | |

* cited by examiner

Primary Examiner — Robert J Hill, Jr.
Assistant Examiner — Christopher P Jones
(74) Attorney, Agent, or Firm — Andrus, Sceales, Starke & Sawall, LLP

(57) ABSTRACT

A filter assembly includes a laterally extending filter element having an element plate extending laterally outwardly therefrom and mounted between axially spaced first and second housing shells. First and second sets of one or more windows are formed axially through the element plate and define a flow path through the assembly.

3 Claims, 2 Drawing Sheets

FILTER ASSEMBLY WITH SEALED WINDOWED FLOW PATH

BACKGROUND AND SUMMARY

The invention relates to filter assemblies.

Filter assemblies are known having a filter element housed in one or more housing shells and sealed and configured to define a given flow path through the assembly from an inlet receiving dirty unfiltered fluid which then flows through the filter element to an outlet discharging clean filtered fluid.

The present invention arose during continuing development efforts directed toward the above technology.

DETAILED DESCRIPTION

Figure 1:
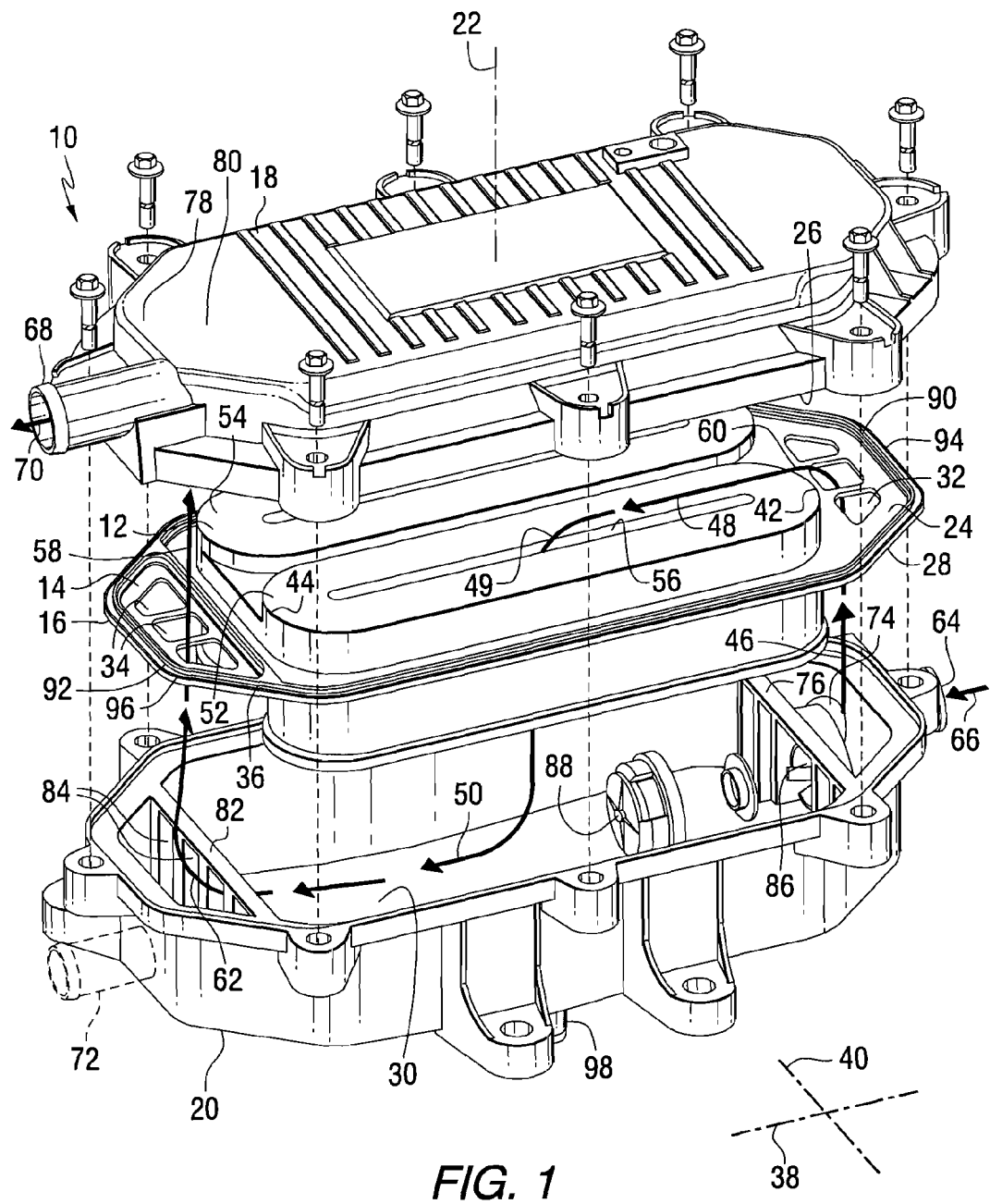
FIG. 1 is an exploded perspective view of a filter assembly in accordance with the invention.
Figure 2:
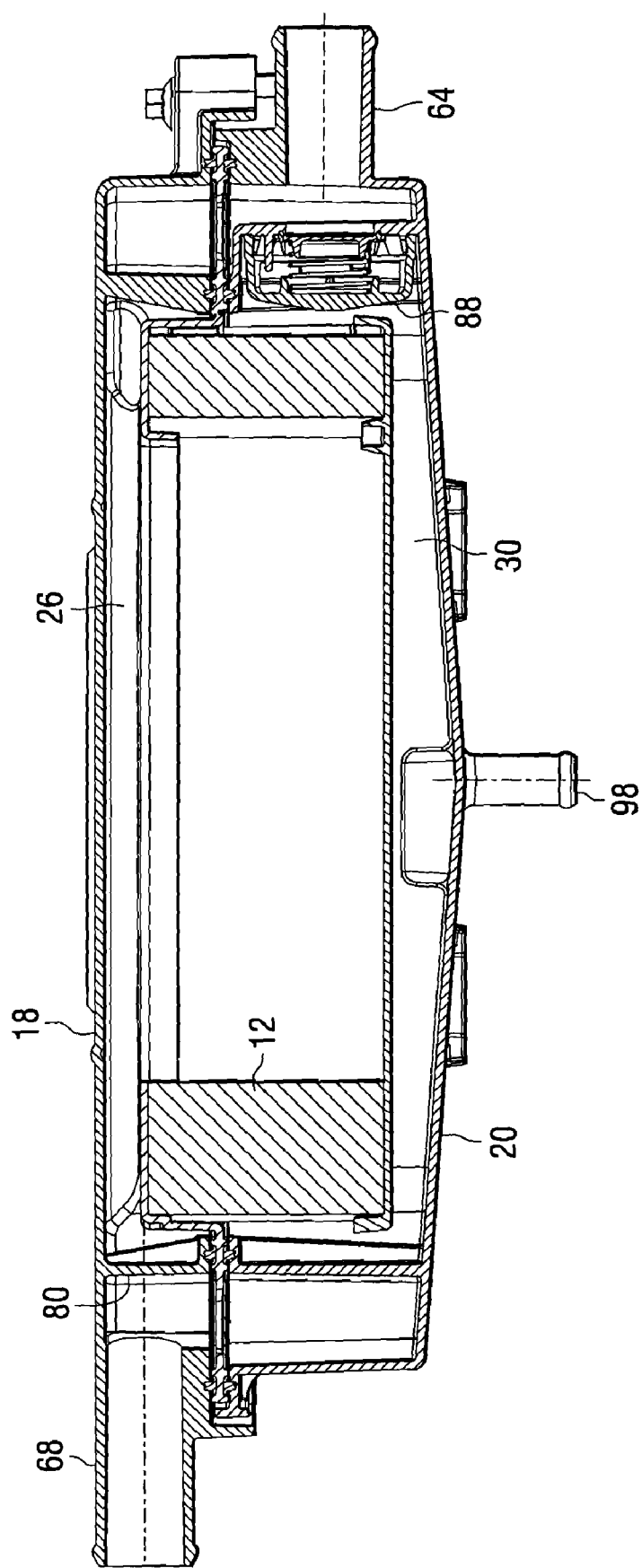
FIG. 2 is a sectional view of the assembly of FIG. 1.

FIGS. 1 and 2 show a filter assembly 10 including a filter element 12 extending laterally along a lateral plane and having an element plate 14 extending laterally outwardly from the filter element to a perimeter 16. First and second housing shells 18 and 20 are axially spaced along an axial direction 22, which axial direction is transverse to the noted lateral plane. Filter element 12 is disposed axially between first and second housing shells 18 and 20. Element plate 14 has a first side 24 axially facing first housing shell 18 and defining a first plenum 26 therebetween. Element plate 14 has a second side 28 axially facing second housing shell 20 and defining a second plenum 30 therebetween. A first set of one or more windows 32 is formed axially through element plate 14 and passes flow axially between the noted plenums. A second set of one or more windows 34 is formed axially through element plate 14 and passes flow axially between the noted plenums. First and second housing shells 18 and 20 mate in sealed relation, preferably by a gasket 36 at element plate 14 along perimeter 16.

The filter assembly has a flow path therethrough through the first set of one or more windows 32 then through filter element 12 then through the second set of one or more windows 34, such that filter element 12 lies along the flow path between the first and second sets of windows 32, 34. Second set of one or more windows 34 is laterally spaced from first set of one or more windows 32 by filter element 12 therebetween. Filter element 12 extends laterally along the noted lateral plane along first and second lateral directions 38 and 40, which lateral directions 38 and 40 are transverse to each other. The first and second sets of one or more windows 32 and 34 are distally oppositely spaced from each other along first lateral direction 38 at respective first and second distally opposite ends 42 and 44 of filter element 12. The noted flow path has a first segment 46 extending axially through the first set of one or more windows 32 in a first axial direction, e.g. upwardly in the orientation of FIG. 1. The flow path has a second segment 48 extending laterally along first plenum 26 and then at least partially axially, e.g. downwardly, through filter element 12 as shown at 49 and then laterally along second plenum 30 as shown at 50. In the embodiment of FIG. 1, filter element 12 is provided by a pair of racetrack shaped elements 52 and 54, each having a hollow interior such as 56 into which the flow enters axially downwardly as shown at 49, and then flows laterally through the filter media element to the outside thereof and then downwardly as shown at 50 into lower plenum 30. The noted flow path has a third segment 58 extending axially, e.g. upwardly in the orientation of FIG. 1, through the second set of one or more windows 34. First segment 46 of the flow path flows in a first axial direction, e.g. upwardly, through the first set of one or more windows 32. Flow along second segment 48-50 flows at least partially axially in a second axial direction, e.g. downwardly, which noted second axial direction is opposite to the noted first axial direction. Flow along third segment 58 of the flow path flows through the second set of one or more windows 34 in the same noted first axial direction, e.g. upwardly. The noted first, second and third segments of the flow path form an S-shaped path having two like-directional flow sections 46 and 58, and one opposite-directional flow section 49. The S-shaped path has two bends, namely a first bend 60 connecting the noted first and second segments, and a second bend 62 connecting the noted second and third segments. First bend 60 is in first plenum 26. Second bend 62 is in second plenum 30.

The filter assembly has an inlet 64 receiving dirty unfiltered fluid as shown at arrow 66. The filter assembly has an outlet 68 discharging clean filtered fluid as shown at arrow 70. In one embodiment, inlet 64 is in one of the first and second housing shells, e.g. second housing shell 20, and outlet 68 is in the other of the first and second housing shells, e.g. second housing shell 18. In another embodiment, the inlet and outlet are in the same one of the housing shells, for example as shown at dashed line outlet 72 from housing shell 20.

Flow along the noted flow path flows from upstream to downstream, namely from inlet 64 to outlet 68. The flow path flows from inlet 64 in second housing shell 20 to the first set of one or more windows 32 to first plenum 26 in first housing shell 18. A first subplenum 74 in second housing shell 20 is adjacent second plenum 30. One of the first and second housing shells, e.g. second housing shell 20, has a dividing wall 76 extending therefrom and separating and defining second plenum 30 and first subplenum 74. The flow flows through inlet 64 into first subplenum 74 on one side of dividing wall 76, e.g. the right side of dividing wall 76 in the orientation of FIG. 1, then through the first set of one or more windows 32 then into first plenum 26 then through filter element 12 then into second plenum 30 on the other side of dividing wall 76, e.g. the left side of dividing wall 76 in the orientation of FIG. 1, which noted other side of the dividing wall is opposite the noted one side of the dividing wall. The flow path flows from second plenum 30 to the second set of one or more windows 34 to outlet 68 in first housing shell 18. A second subplenum 78 in first housing shell 18 is adjacent first plenum 26. One of the first and second housing shells, e.g. first housing shell 18, has a second dividing wall 80 extending therefrom and separating and defining first plenum 26 and second subplenum 78. The flow flows from first plenum 26 on one side of second dividing wall 80, e.g. the right side of dividing wall 80 in the orientation of FIG. 1, then through filter element 12 into second plenum 30 then through the second set of one or more windows 34 into second subplenum 78 on the other side of second dividing wall 80, e.g. the left side of dividing wall 80 in the orientation of FIG. 1, which noted other side of second dividing wall 80 is opposite the noted one side of second dividing wall 80. Second housing shell 20 may have a support rib 82 extending thereacross with a plurality of apertures 84 therethrough through which the flow travels from segment 50 in lower plenum 30 leftwardly through such apertures 84 and then turns at 62 upwardly along segment 58 through windows 34. At the inlet end of the assembly, dividing wall 76 may have an aperture 86 in which a pressure responsive bypass or relief valve is mounted and which opens in response to excessive pressure if filter element 12 becomes plugged, to in turn enable the inlet flow at 66 to flow through the pressure-opened valve 88 into lower plenum 30 for discharge at segment 58 to outlet 68.

A perimeter seal is provided by gasket 36 sealing first and second housing shells 18 and 20 to each other at element plate 14 along perimeter 16. A first subperimeter seal 90 defines a first subperimeter around the first set of one or more windows 32 and seals element plate 14 to the housing shells along the first subperimeter. A second subperimeter seal 92 defines a second subperimeter around the second set of one or more windows 34 and seals element plate 14 to the housing shells along the second subperimeter. First subperimeter seal 90 has a section coextensive with a first section 94 of the perimeter seal 36. Second subperimeter seal 92 has a section coextensive with a second section 96 of perimeter seal 36. The noted first and second sections 94 and 96 of perimeter seal 36 are noncoextensive.

In one desirable implementation, filter element 12 is provided by one or more closed-loop coalescer filter elements such as 52 and 54 each having a central axial passage 56. The flow path extends axially through the first set of one or more windows 32 then laterally at 48 along first plenum 26 then axially at 49 along the noted central axial passage 56 then laterally outwardly through the coalescer filter element then laterally along second plenum 30 as shown at arrow 50 then through the second set of one or more windows 34 as shown at arrow 58. Coalesced liquid collects in second housing shell 20 in lower plenum 30 and is drained at drain outlet 98.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A filter assembly comprising a filter element extending laterally along a lateral plane, an element plate extending laterally outwardly from said filter element to a perimeter, first and second housing shells axially spaced along an axial direction, said axial direction being transverse to said lateral plane, said filter element being axially between said first and second housing shells, said element plate having a first side axially facing said first housing shell and defining a first plenum therebetween, said element late having a second side axially facing said second housing shell and defining a second plenum therebetween, a first set of one or more windows formed axially through said element plate and passing flow axially between said first and second plenums, a second set of one or more windows formed axially through said element plate and passing flow axially between said first and second plenums, wherein said filter assembly has a flow path therethrough through said first set of one or more windows then through said filter element then through said second set of one or more windows, such that said filter element lies along said flow path between said first and second sets of one or more windows, wherein said flow path has a first segment extending axially through said first set of one or more windows in a first axial direction, a second segment extending laterally along said first plenum and then at least partially axially through said filter element and then laterally along said second plenum, and a third segment extending axially through said second set of one or more windows, wherein flow along said first segment of said flow path flows in a first axial direction through said first set of one or more windows, and flow along said third segment of said flow path flows through said second set of one or more windows in the same said first axial direction.

2. A filter assembly comprising a filter element extending laterally along a lateral plane, an element late extending laterally outwardly from said filter element to a perimeter, first and second housing shells axially spaced along an axial direction, said axial direction being transverse to said lateral plane, said filter element being axially between said first and second housing shells, said element plate having a first side axially facing said first housing shell and defining a first plenum therebetween, said element plate having a second side axially facing said second housing shell and defining a second plenum therebetween, a first set of one or more windows formed axially through said element plate and passing flow axially between said first and second plenums, a second set of one or more windows formed axially through said element plate and passing flow axially between said first and second plenums, wherein said filter assembly has a flow path therethrough through said first set of one or more windows then through said filter element then through said second set of one or more windows, such that said filter element lies along said flow path between said first and second sets of one or more windows, wherein flow along said flow path flows from upstream to downstream including from an inlet in said second housing shell to said first set of one or more windows to said first plenum to said filter element to said second plenum to said second set of one or more windows to an outlet in said first housing shell, and comprising a first subplenum in said second housing shell adjacent said second plenum, and a second subplenum in said first housing shell adjacent said first plenum, wherein a given one of said first and second housing shells has a first dividing wall extending therefrom and separating and defining said second plenum and said first subplenum, wherein flow flows through said inlet into said first subplenum on one side of said first dividing wall then through said first set of one or more windows then into said first plenum then through said filter element then into said second plenum on another side of said first dividing wall opposite said one side of said first dividing wall, and wherein a selected one of said first and second housing shells has a second dividing wall extending therefrom and separating and defining said first plenum and said second subplenum, wherein fluid flows from said first plenum on one side of said second dividing wall then through said filter element then into said second plenum then through said second set of one or more windows into said second subplenum on another side of said second dividing wall opposite said one side of said second dividing wall.

3. A filter element for a filter assembly having first and second housing shells facing each other along an axial direction and defining first and second plenums, said filter element extending laterally along a lateral plane and having an element plate extending laterally outwardly therefrom to a perimeter, said axial direction being transverse to said lateral plane, said filter element being locatable between said first and second housing shells, said element ate having a first side axially facing said first plenum, said element late having a second side axially facing said second plenum, a first set of one or more windows formed axially through said element plate and passing flow axially between said first and second plenums, a second set of one or more windows formed axially through said element plate and passing flow axially between said first and second plenums, wherein said filter element has a flow path therethrough through said first set of one or more windows then through said filter element then through said second set of one or more windows, such that said filter element lies along said flow path between said first and second sets of one or more windows, wherein said flow path has a first segment extending axially through said first set of one or more windows in a first axial direction, a second segment extending laterally along said first plenum and then at least partially axially through said filter element and then laterally along said second plenum, and a third segment extending axially through said second set of one or more windows, wherein flow along said first segment of said flow path flows in a first axial direction through said first set of one or more windows, and flow along said third segment of said flow path flows through said second set of one or more windows in the same said first axial direction.

* * * * *